United States Patent
Keum et al.

(10) Patent No.: US 9,148,682 B2
(45) Date of Patent: Sep. 29, 2015

(54) METHOD AND APPARATUS FOR PROVIDING BROADCAST CONTENT AND SYSTEM USING THE SAME

(71) Applicant: Samsung Electronics Co., Ltd., Gyeonggi-do (KR)

(72) Inventors: Ji-Eun Keum, Gyeonggi-do (KR); Sung-Ryeul Rhyu, Gyeonggi-do (KR); Seo-Young Hwang, Gyeonggi-do (KR); Jae-Yeon Song, Seoul (KR); Bo-Sun Jung, Gyeonngi-do (KR)

(73) Assignee: Samsung Electronics Co., Ltd (KR)

( * ) Notice: Subject to any disclaimer, the term of this patent is extended or adjusted under 35 U.S.C. 154(b) by 378 days.

(21) Appl. No.: 13/895,749

(22) Filed: May 16, 2013

(65) Prior Publication Data

US 2013/0254826 A1    Sep. 26, 2013

Related U.S. Application Data

(62) Division of application No. 13/044,097, filed on Mar. 9, 2011, now Pat. No. 8,463,849.

(30) Foreign Application Priority Data

Mar. 9, 2010    (KR) .................. 10-2010-0021036

(51) Int. Cl.
*G06F 15/16* (2006.01)
*H04N 21/258* (2011.01)
(Continued)

(52) U.S. Cl.
CPC ......... *H04N 21/25866* (2013.01); *H04H 20/40* (2013.01); *H04H 20/82* (2013.01); *H04L 65/4076* (2013.01); *H04L 65/604* (2013.01);
(Continued)

(58) Field of Classification Search
CPC . H04N 5/782; H04N 9/8042; H04N 21/4334; H04N 21/44209; H04N 21/47202; H04N 21/25866; H04N 21/6375; H04N 21/6587; H04N 21/812; H04N 21/8456; H04H 20/40; H04H 20/82; H04H 60/13; H04H 60/17; H04H 2201/70; H04L 65/80; H04L 65/604; H04L 65/4076
USPC ......... 709/203, 216, 217, 226, 231, 232, 234; 725/25, 37, 105
See application file for complete search history.

(56) References Cited

U.S. PATENT DOCUMENTS 7,269,775 B2    9/2007    Pendakur et al.
7,991,832 B2    8/2011    Hatanaka et al.
(Continued)

FOREIGN PATENT DOCUMENTS

EP    1 361 690    11/2003
EP    1 494 375    1/2005
(Continued)

*Primary Examiner* — Michael Y Won
(74) *Attorney, Agent, or Firm* — The Farrell Law Firm, P.C.

(57) ABSTRACT

A method and apparatus for providing broadcast content by an adaptive streaming service and a system using the same are provided, in which a content transmission server configures and transmits a manifest file including a content IDentifier (ID), and a client device receives the manifest file, determines whether the content ID included in the manifest file is identical to an ID of user-requested content for recording, and records a content segment received from a content providing server, if the content ID included in the manifest file is identical to the ID of the user-requested content.

10 Claims, 12 Drawing Sheets

(51) Int. Cl.

| | |
|---|---|
| *H04H 20/40* | (2008.01) |
| *H04H 20/82* | (2008.01) |
| *H04N 5/782* | (2006.01) |
| *H04N 9/804* | (2006.01) |
| *H04N 21/433* | (2011.01) |
| *H04N 21/442* | (2011.01) |
| *H04N 21/472* | (2011.01) |
| *H04N 21/6375* | (2011.01) |
| *H04N 21/6587* | (2011.01) |
| *H04N 21/81* | (2011.01) |
| *H04N 21/845* | (2011.01) |
| *H04L 29/06* | (2006.01) |
| *H04H 60/13* | (2008.01) |
| *H04H 60/17* | (2008.01) |

(52) U.S. Cl.
CPC ............... *H04L 65/80* (2013.01); *H04N 5/782* (2013.01); *H04N 9/8042* (2013.01); *H04N 21/4334* (2013.01); *H04N 21/44209* (2013.01); *H04N 21/47202* (2013.01); *H04N 21/6375* (2013.01); *H04N 21/6587* (2013.01); *H04N 21/812* (2013.01); *H04N 21/8456* (2013.01); *H04H 60/13* (2013.01); *H04H 60/17* (2013.01); *H04H 2201/70* (2013.01)

(56) References Cited

U.S. PATENT DOCUMENTS

| | | | |
|---|---|---|---|
| 2002/0054578 A1* | 5/2002 | Zhang et al. ................... | 370/328 |
| 2003/0016673 A1 | 1/2003 | Pendakur et al. | |
| 2003/0067877 A1* | 4/2003 | Sivakumar et al. ........... | 370/232 |
| 2003/0204602 A1 | 10/2003 | Hudson et al. | |
| 2004/0052234 A1* | 3/2004 | Ameigeiras et al. .......... | 370/338 |
| 2006/0212902 A1 | 9/2006 | Seo et al. | |
| 2006/0224763 A1* | 10/2006 | Altunbasak et al. .......... | 709/231 |
| 2006/0274612 A1 | 12/2006 | Kim | |
| 2008/0028170 A1 | 1/2008 | Clinick et al. | |
| 2009/0055547 A1 | 2/2009 | Hudson et al. | |
| 2009/0249403 A1 | 10/2009 | Keum et al. | |
| 2011/0288970 A1 | 11/2011 | Kidron et al. | |
| 2011/0305435 A1 | 12/2011 | Tanaka et al. | |
| 2012/0011225 A1 | 1/2012 | Keum et al. | |
| 2013/0028088 A1* | 1/2013 | Do et al. ....................... | 370/235 |
| 2013/0294246 A1* | 11/2013 | Geijer Lundin ............... | 370/235 |
| 2014/0082146 A1* | 3/2014 | Bao et al. ...................... | 709/219 |

FOREIGN PATENT DOCUMENTS

| | | |
|---|---|---|
| EP | 1 936 991 | 6/2008 |
| KR | 1020060067849 | 6/2006 |
| KR | 1020090103701 | 10/2009 |

* cited by examiner

METHOD AND APPARATUS FOR PROVIDING BROADCAST CONTENT AND SYSTEM USING THE SAME

PRIORITY

This application is a Divisional Application of U.S. application Ser. No. 13/044,097, which was filed in the U.S. Patent and Trademark Office on Mar. 9, 2011, and claims priority under 35 U.S.C. §119(a) to a Korean Patent Application filed in the Korean Intellectual Property Office on Mar. 9, 2010 and assigned Serial No. 10-2010-0021036, the contents of each of which are incorporated herein by reference.

BACKGROUND OF THE INVENTION

1. Field of the Invention

The present invention generally relates to a method and apparatus for providing broadcast content and a system using the same, and, more particularly, to a method and apparatus for providing broadcast content by an adaptive streaming service and a system using the same.

2. Description of the Related Art

With the recent increase in the number of users using online content, the reliable transmission of content has become increasingly important. Thus, adaptive streaming has been introduced, which smoothly adjusts the bitrate of content according to an available transmission bandwidth or a change in the performance of a user device. Adaptive streaming is a technology that optimizes bitrate by analyzing the network environment of a user. Several standardization organizations are discussing HyperText Transfer Protocol (HTTP)-based transmission technologies such as adaptive streaming, in which a user terminal is allowed to select small content units obtained by dividing content depending on the terminal's conditions and play the selected content units, and, thus, the user can receive the content without delay or interruptions.

In the Internet Protocol (IP)-based convergence era, convergence between communication and broadcasting has attracted attention as a new business model that will lead a future-generation market. In particular, IP TeleVision (IPTV) is a technology that provides a reassembled or integrated service of conventional TV, voice, and data services and supports interaction. Thus, IPTV will create various business models and services. IPTV technology provides services to fixed terminals such as a set-top box, Personal Computers (PC), TVs, and the like, mobile terminals such as hand-held phones, Personal Digital Assistants (PDAs), and the like a wired network, a wireless network, and a broadcast network, beyond services customized for conventional limited terminal environments. That is, the IPTV technology provides services irrespective of the types of terminals and networks. Therefore, the same service can be provided and applied to various environments and various services can be created for various environments.

When broadcast content is provided by adaptive streaming, the broadcast content is transmitted based on time, not based on content. Therefore, if a user requests recording of specific content, that content is recorded based on its playtime. In view of the variable length of content inherent to live streaming, the content may not be accurately recorded. If an advertisement is inserted in the middle of content broadcasting, there is no way for a user storage to record only the content by discriminating the content from the advertisement.

SUMMARY OF THE INVENTION

An aspect of embodiments of the present invention is to address at least the problems and/or disadvantages discussed above and to provide at least the advantages described below. Accordingly, an aspect of embodiments of the present invention is to provide a method and apparatus for providing broadcast content by adaptive streaming and a system using the same, in a digital broadcast system.

Another aspect of embodiments of the present invention is to provide a method and apparatus for performing a predetermined operation on user-selected content only when broadcast content is provided by adaptive streaming, and a system using the same, in a digital broadcast system.

Another aspect of embodiments of the present invention is to provide a method and apparatus for, if non-preferred content is played in the middle of preferred content, recording the preferred content only in a user storage, when broadcast content is provided by adaptive streaming, and a system using the same, in a digital broadcast system.

A further aspect of embodiments of the present invention is to provide a method and apparatus for, if a partial file (e.g., segment) of content is lost due to a network situation or an ambient situation, providing the lost content segment later, when broadcast content is received by adaptive streaming, and a system using the same, in a digital broadcast system.

In accordance with an embodiment of the present invention, a method for is provided for providing broadcast content in a digital broadcast system, in which a manifest file including a content IDentifier (ID) is configured and transmitted by a content transmission server, the manifest file is received by a client device, it is determined whether the content ID included in the manifest file is identical to an ID of user-requested content by the client device for recording, and a content segment received from a content providing server is recorded by the client device, if the content ID included in the manifest file is identical to the ID of the user-requested content.

In accordance with another embodiment of the present invention, there is a system is provided for providing broadcast content in a digital broadcast system, in which a content transmission server configures a manifest file including a content ID and transmits the manifest file, and a client device receives the manifest file, determines whether the content ID included in the manifest file is identical to an ID of user-requested content for recording, and records a content segment received from a content providing server, if the content ID included in the manifest file is identical to the ID of the user-requested content.

In accordance with another embodiment of the present invention, a method is provided for providing broadcast content in a digital broadcast system, in which segments of broadcast content are received, it is determined whether there is a lost segment among the received segments, if there is a lost segment, the lost segment is identified and acquired from a server, and the acquired segment is combined with an already recorded stream of the broadcast content.

In accordance with another embodiment of the present invention, a client device is provided for providing broadcast content in a digital broadcast system, in which a receiver receives segments of broadcast content, and a controller determines whether there is a lost segment among the received segments, identifies, if there is a lost segment, the lost segment, acquires the lost segment from a server, and controls a storage to combine the acquired segment with an already recorded stream of the broadcast content.

In accordance with another embodiment of the present invention, a method is provided for providing broadcast content in a digital broadcast system, including receiving from a content transmission server a manifest file including at least one of a content IDentifier (ID) and last segment indication information; determining whether the content ID included in the manifest file is identical to an ID of user-requested content for recording; and recording content received from a content providing server, if the content ID included in the manifest file is identical to the ID of the user-requested content for recording.

In accordance with a further embodiment of the present invention, a client device is provided for providing broadcast content in a digital broadcast system, including: a receiver for receiving from a content transmission server a manifest file including at least one of a content IDentifier (ID) and last segment indication information; and a controller or determining whether the content ID included in the manifest file is identical to an ID of user-requested content for recording, and controlling a storage to record content received from a content providing server, if the content ID included in the manifest file is identical to the ID of the user-requested content for recording.

BRIEF DESCRIPTION OF THE DRAWINGS

The above and other objects, features and advantages of certain embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EMBODIMENTS OF THE PRESENT INVENTION

Reference will now be made in detail to the preferred embodiments of the present invention with reference to the accompanying drawings. Also, when possible, the same reference numbers will be used throughout the drawings and the specification to refer to the same or similar parts.

The following detailed description includes such detail to help provide a full understanding of the present invention. However, it will be apparent to those skilled in the art that the present invention can be carried out without such detail. In some cases, to prevent the concept of the present invention from being ambiguous or unclear, structures and apparatuses of the known art will be omitted.

In the description of the present invention, a representative embodiment of the present invention will be given to achieve the foregoing technical goals. For the sake of convenience of description, the names of entities as defined in the Open IPTV Forum (OIPF) will be used. However, it should be understood that the standard and names do not limit the scope of the present invention and are also applicable to similar systems.

Figure 1:
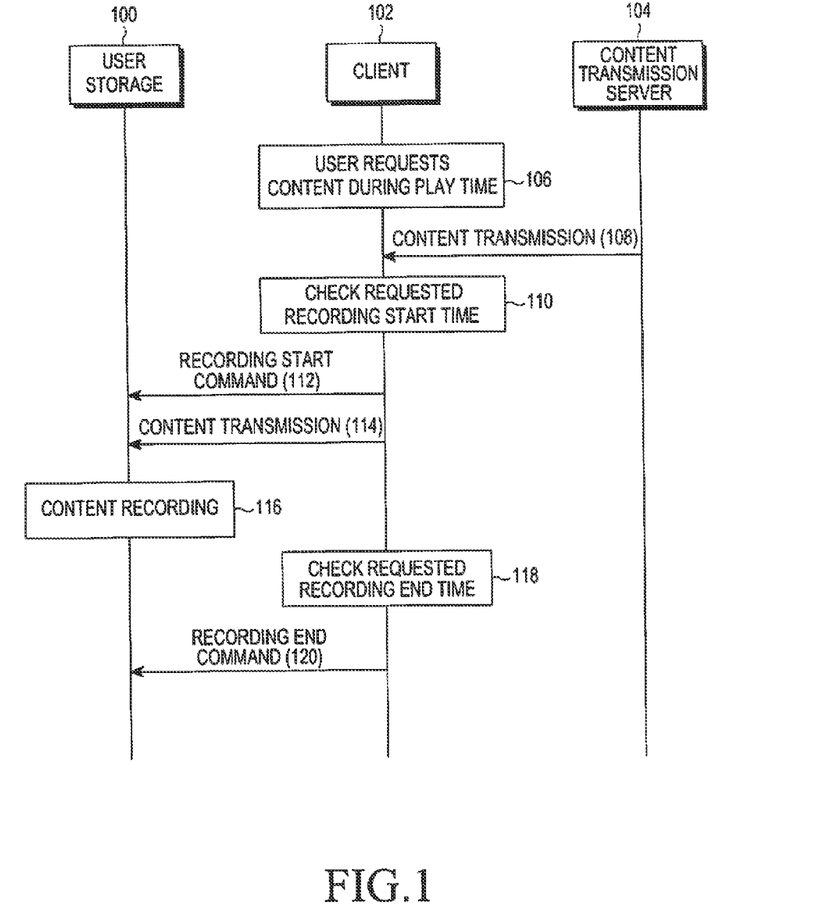
FIG. 1 is a diagram illustrating a signal flow of an operation for recording preferred content in a user storage in an Internet Protocol (IP)-based digital broadcast system according to an embodiment of the present invention.

FIG. 1 is a diagram illustrating a signal flow for an operation of recording user-preferred content in a user storage in an IP-based digital broadcast system according to an embodiment of the present invention.

Referring to FIG. 1, a user requests recording of user-selected content for a specific time period through a client device 102 in step 106. In step 108, a content transmission server 104 transmits the content to the client device 102. The client device 102 compares a user-requested recording start time with a current time in step 110. If the current time is the requested recording start time, the client device 102 transmits a recording start command to a user storage 100 in step 112 and transmits the received content to the user storage 100 in step 114.

The user storage 100 records the content received from the client device 102 in step 116. The client device 102 checks a user-requested recording end time in step 118 and, if it is time to end the recording, the client device 102 commands the user storage 100 to end the recording in step 120. The requested recording end time may be a time set by a recording end input of the user. The recording end input may be entered when requesting the recording in step 106 or at any time during the recording. Or the user may set a predetermined time period, e.g., one hour when requesting the recording in step 106 so that the client device 102 may check the requested recording end time according to the time period.

In this IP-based digital broadcast system related to the present invention, broadcast content received by adaptive streaming is stored only based on time, not on the content. Accordingly, when a user requests recording of specific content, the content is recorded based on the playtime of the content. Considering the nature of live streaming, and, more specifically, the variable length of live streaming content, the content may not be accurately recorded. If content that the user would rather not view ("user non-preferred content"), such as an advertisement, is played in the middle of playing content that the user wants to record ("preferred content"), the user storage 100 cannot record only the preferred content by differentiating the non-preferred content from the preferred content.

Thus, a description will be given below of a method and apparatus for defining a content IDentifier (ID) for a content segment corresponding to each partial file of content and adding an element indicating the end of the content in a manifest file preliminarily configured and transmitted for adaptive streaming, so that a user may record only desired content, and a system using the same according to the present invention.

Additionally, a description will be given of a method and apparatus for, when a client device fails to receive a partial file ("segment") of broadcast content due to a network situation, enabling the client device to determine the failed segment, request the failed segment to a server, and receive the failed segment from the server, and a system using the same according to the present invention. Further, a method and apparatus for effectively acquiring a lost segment from a server and a system using the same will be described.

Figure 2:
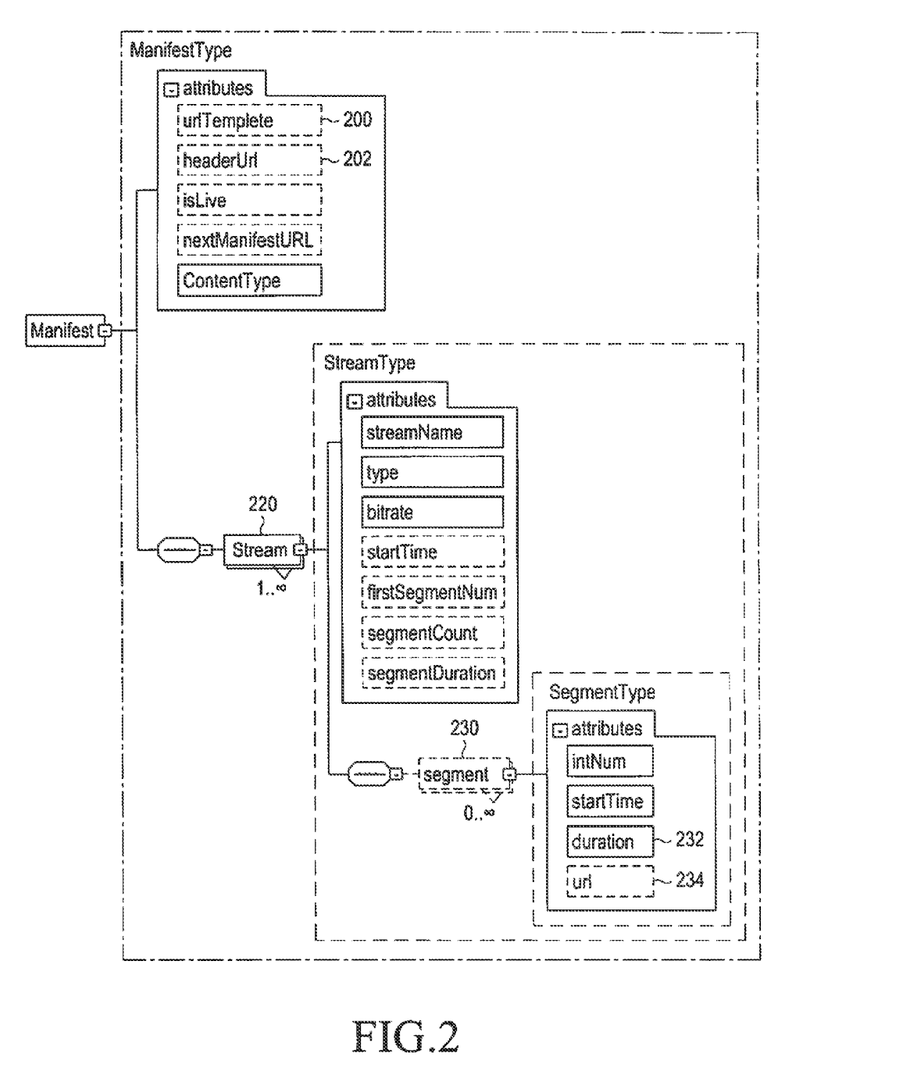
FIG. 2 illustrates a basic manifest file required for adaptive streaming transmission, which a server preliminarily provides to a client device according to an embodiment of the present invention.

In accordance with an embodiment of the present invention, when a client device fails to receive a segment due to a transmission error during an adaptive streaming service, the client device requests retransmission of the failed segment and receives a segment with the same segment ID as the failed segment in a stream having the average bitrate of segments before and after the failed segment. As a result, content could be played smoothly. FIG. 2 illustrates a basic manifest file required for adaptive streaming transmission, which a server preliminarily provides to a client device according to an embodiment of the present invention. A manifest file is metadata transmitted before content transmission. The details of the manifest file are not related directly to the present invention and thus will not be described in detail.

The client device receives a manifest file as illustrated in FIG. 2, accesses a Uniform Resource Locator (URL) 234 being an address at which a segment can be downloaded from a server, and requests the segment from the URL 234. For this purpose, attributes called urlTemplate 200 and header Url 202 are used. There are a plurality of streams 220 transmitting content at varying bitrates. While the segments 230 of each bitstream 220 share information about a playtime, that is, Duration 232 and Url 234, parameters specific to the segments 230 may be configured individually for the segments 230.

Figure 3:
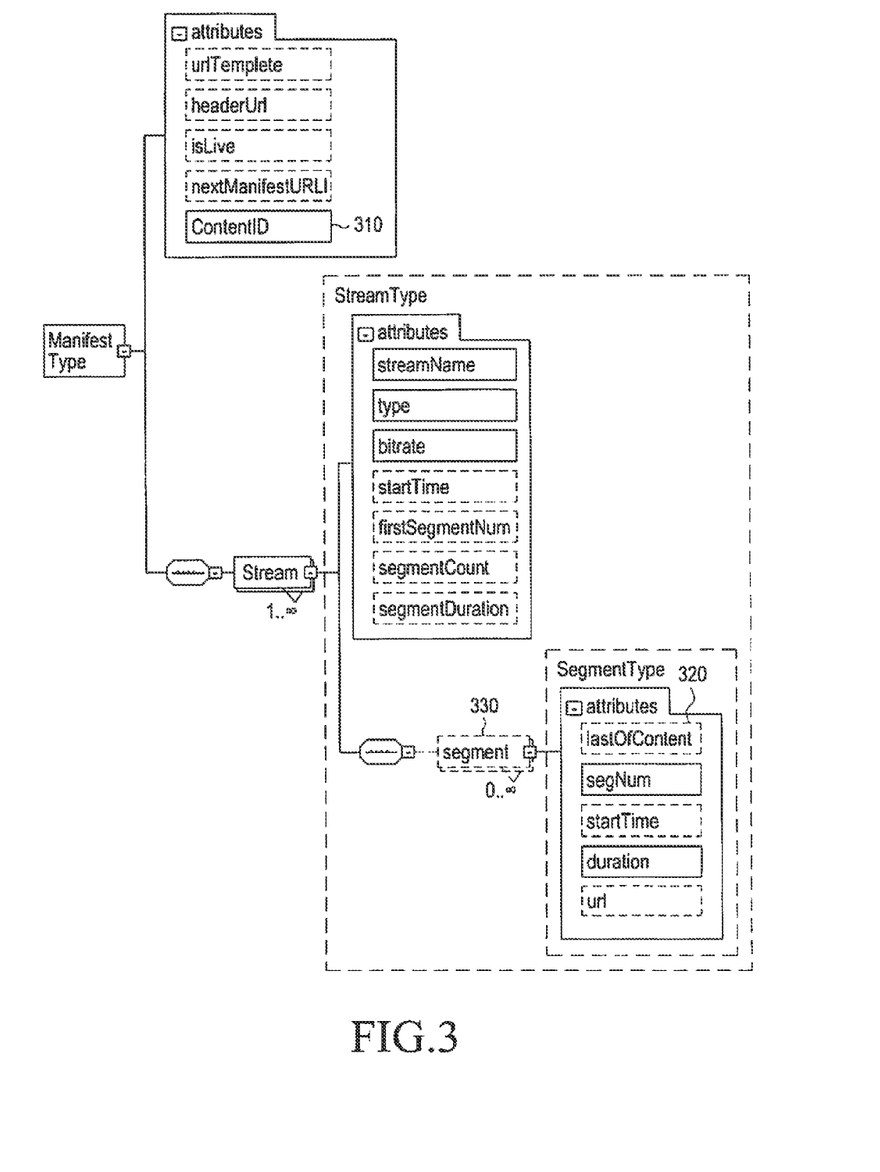
FIG. 3 illustrates a manifest file for adaptive streaming to be transmitted to a client device according to an embodiment of the present invention.

FIG. 3 illustrates a manifest file for adaptive streaming to be transmitted to a client device according to an embodiment of the present invention. In this embodiment, one manifest file is used for adaptive streaming of one content item.

A ContentID 330 element for identifying content is added at a high level in the manifest file and a lastOfContent 320 element, i.e., last segment indication information, indicating the last segment of the content is added under a segment 330. When the lastOfContent element 320 is true (e.g., "1"), the client device determines that the segment 330 is the last segment of the content with the ContentID 310 in the embodiment of the present invention.

The client device checks the ContentID 310 of the manifest file. If the ContentID 310 is identical to the content ID of user-requested content for recording, the client device starts to record the content. For transmission of one content item, a plurality of manifest files may be transmitted. However, the client device checks only the ContentID 310 in the received manifest file and, if the ContentID 310 is different than the content ID of the user-requested content, the client device commands the user storage not to record the content.

Figure 4:
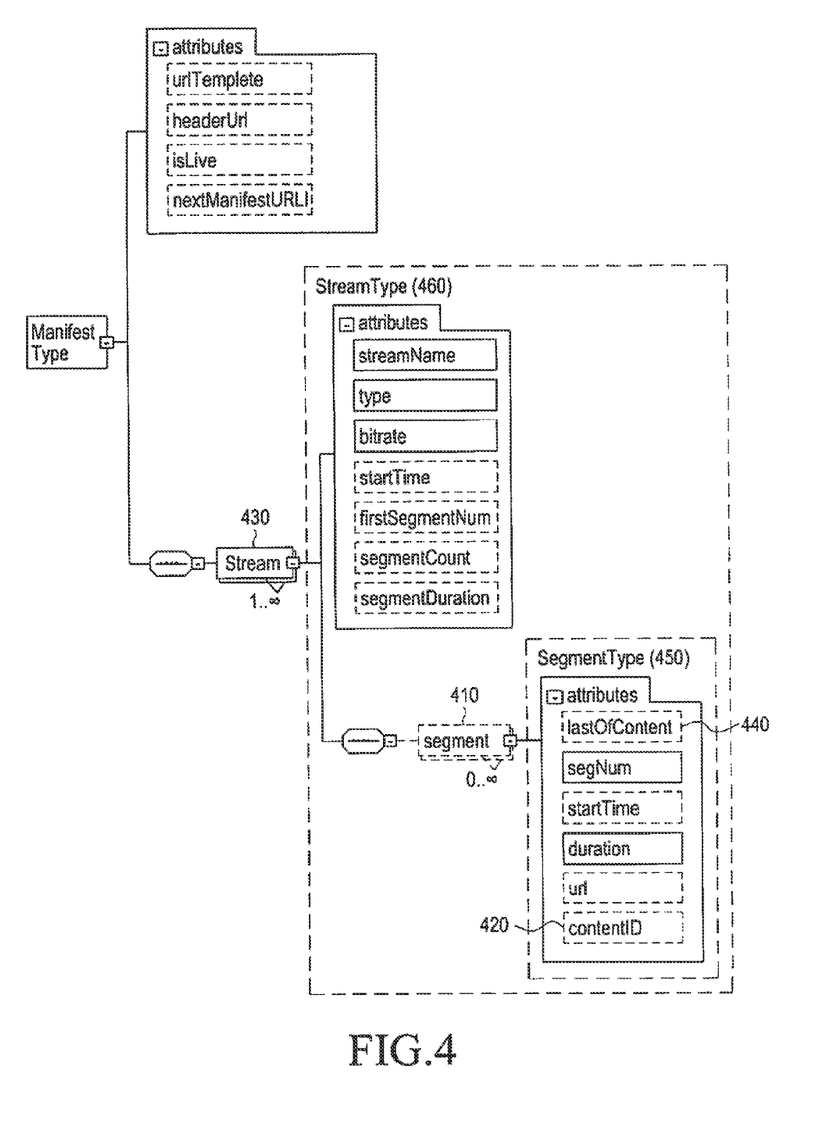
FIG. 4 illustrates a manifest file for adaptive streaming to be transmitted to a client device according to another embodiment of the present invention.

FIG. 4 illustrates a manifest file for adaptive streaming to be transmitted to a client device according to another embodiment of the present invention. In FIG. 4, a manifest file is transmitted irrespective of content. That is, a plurality of continuous content items share one manifest file. Thus, the client device records a segment 410 where it is the intended recipient by checking the contentID 420 of the segment 410. Accordingly, the contentID element 420 should be inserted under the segment 410. Alternatively or additionally, the contentID element 420 may be inserted under a stream 430.

While the last segment indication information, i.e., lastOfContent 440 and the contentID 420, are shown in FIG. 4 as included in SegmentType 450, they may, instead, be included in StreamType 460.

Figure 5A:
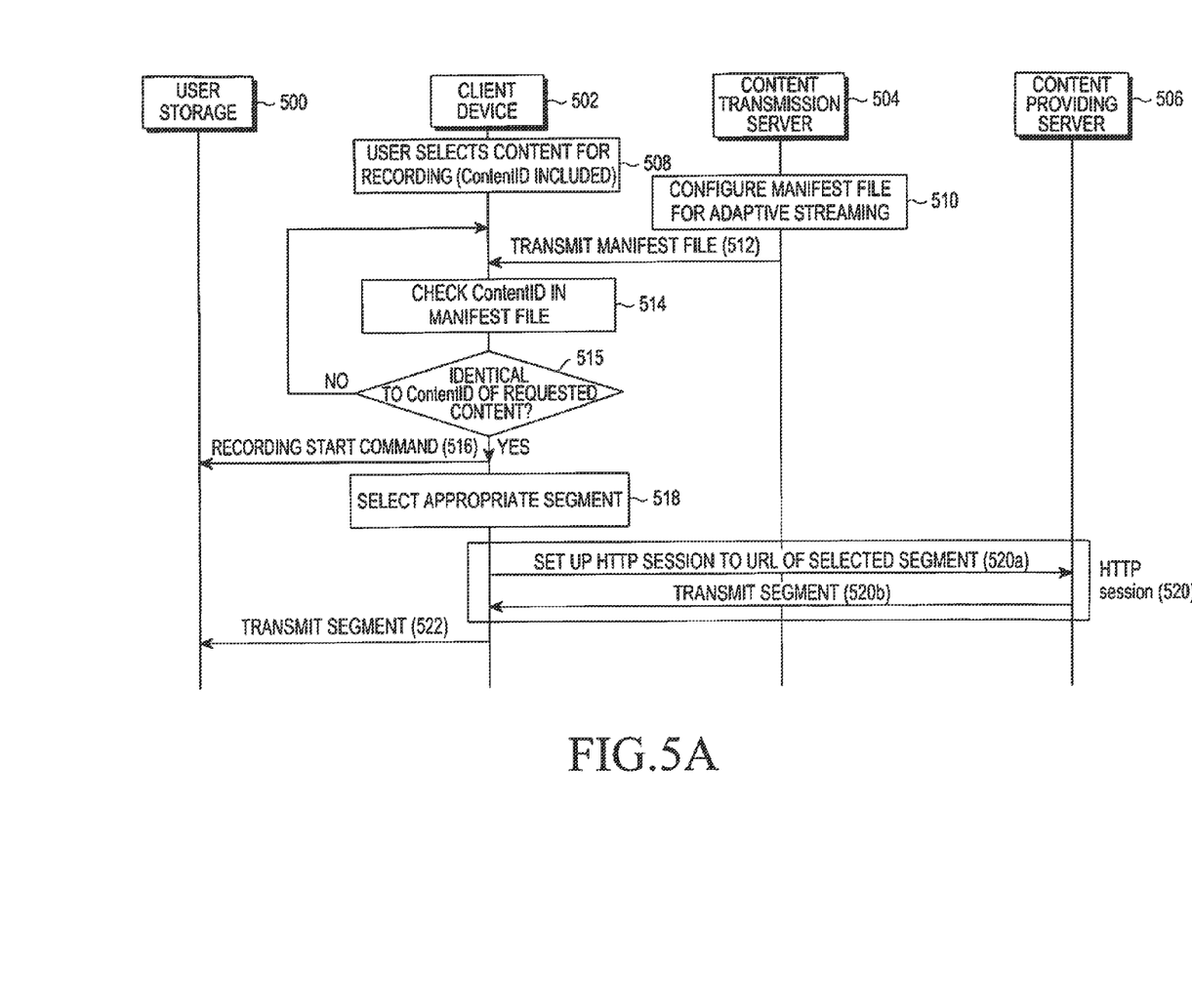
FIGS. 5A and 5B are diagrams illustrating signal flows for operations of devices according to an embodiment of the present invention.
Figure 5B:
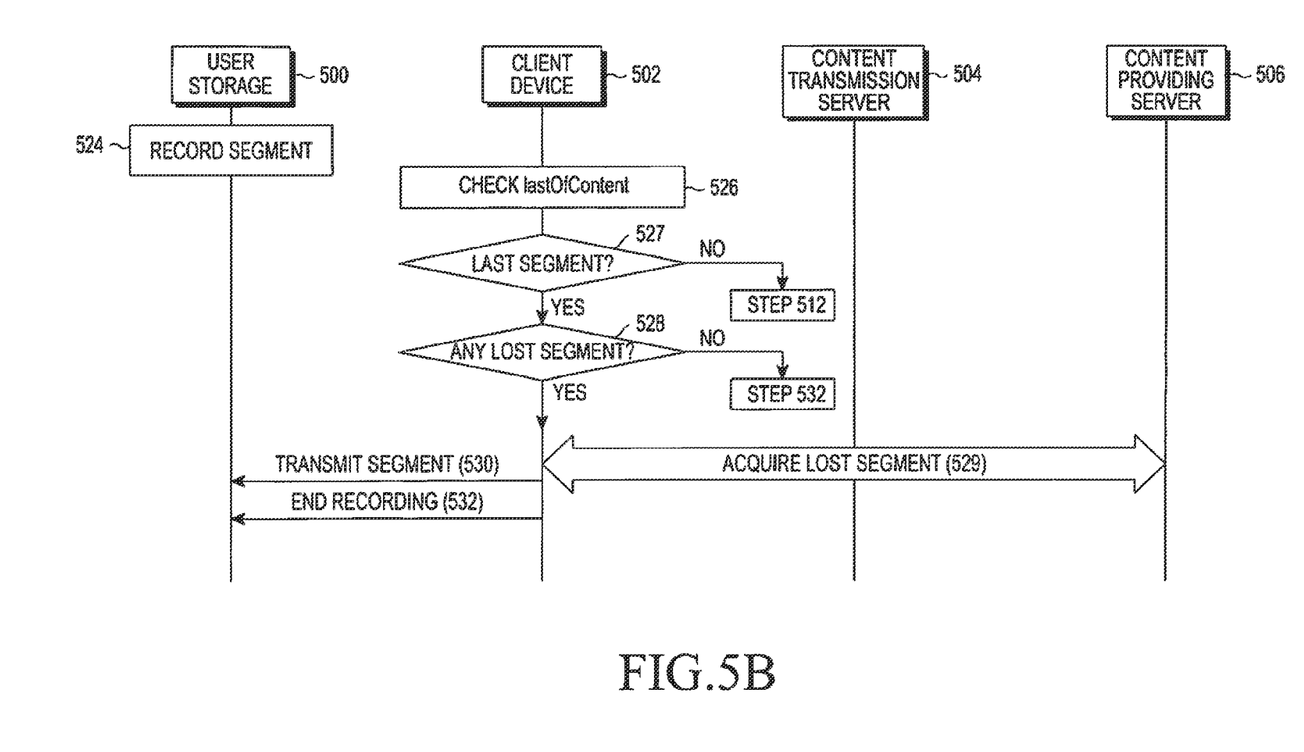

FIGS. 5A and 5B are diagrams illustrating signal flows for operations of devices according to an embodiment of the present invention.

Referring to FIGS. 5A and 5B, a user selects desired content for recording through a client device 502 in step 508. The selection may be made through an Electronic Program Guide (EPG). In step 508, the user inputs the content ID of the content that they want to record to the client device 502. The content ID may be any input that identifies the content. For example, the content ID may be a program title, a service provider name, or a preset short number or key. A content transmission server 504 configures a manifest file to support adaptive streaming in step 510 and transmits the manifest file to the client device 502 in step 512.

Upon receipt of the manifest file, the client device 502 checks the ContentID in the received manifest file in step 514 and compares the ContentID with the content ID of the user-requested content for recording in step 515. If the ContentID is identical to the content ID of the user-requested content, the client device 502 transmits a recording start command to a user storage 500 in step 516. However, if the ContentID is different than the content ID of the user-requested content, the client device 502 awaits receipt of a new manifest file in step 512.

In step 518, the client device 502 selects an appropriate segment based on the manifest file received in step 512 according to the performance or situation of the client device 502. For example, the client device 502 may select a segment of a bitrate appropriate for a good or bad network state and may select a segment corresponding to a user-selected language.

The client device 502 and a content providing server 506 set up a HyperText Transfer Protocol (HTTP) session in step 520. More specifically, the client device 502 sets up an HTTP session to access the URL on the content providing server 506 of the selected segment in step 520a. The content providing server 506 transmits the selected segment to the client device 502 using the HTTP session in step 520b. The client device 502 transmits the received segment to the user storage 500 in step 522 and the user storage 500 records the received segment in step 524.

The client device 502 checks the last segment indication information, i.e., the lastOfContent element of the manifest file and determines whether the segment is the last of the user-requested content in step 526. If the received segment turns out to be the last segment in the last segment indication information in step 527, the client device 502 determines whether any segment has been lost a lost segment in step 528. If a segment has been lost, the client device 502 acquires the lost segment from the content providing server 506 in step 529. The operation of acquiring a lost segment in step 529 will be described later in detail with reference to FIG. 9. Whether a segment was lost a lost segment can be determined using a segment ID and the total number of segments. After transmitting the lost segment received from the content providing server 506 to the user storage 500 in step 530, the client device 502 transmits a recording end command to the user storage 500 in step 532. However, if the received segment is not the last segment in step 527, the client device 502 returns to step 512 to receive a manifest file.

In the absence of a lost segment in step 528, the client device 502 transmits a recording end command to the user storage 500 in step 532.

While the same content providing server transmits segments in steps 520 and 529 in the description of FIG. 5, this is for illustrative purposes only. Thus, different content providers may transmit the segments. Moreover, while the user storage 500 and the client device 502 are shown in FIGS. 5A and 5B as separately configured, the user storage 500 may be incorporated into the client device 502. The content transmission server 504 and the content providing server 506, which are separately configured in FIGS. 5A and 5B, may also be incorporated into a single server.

Figure 6A:
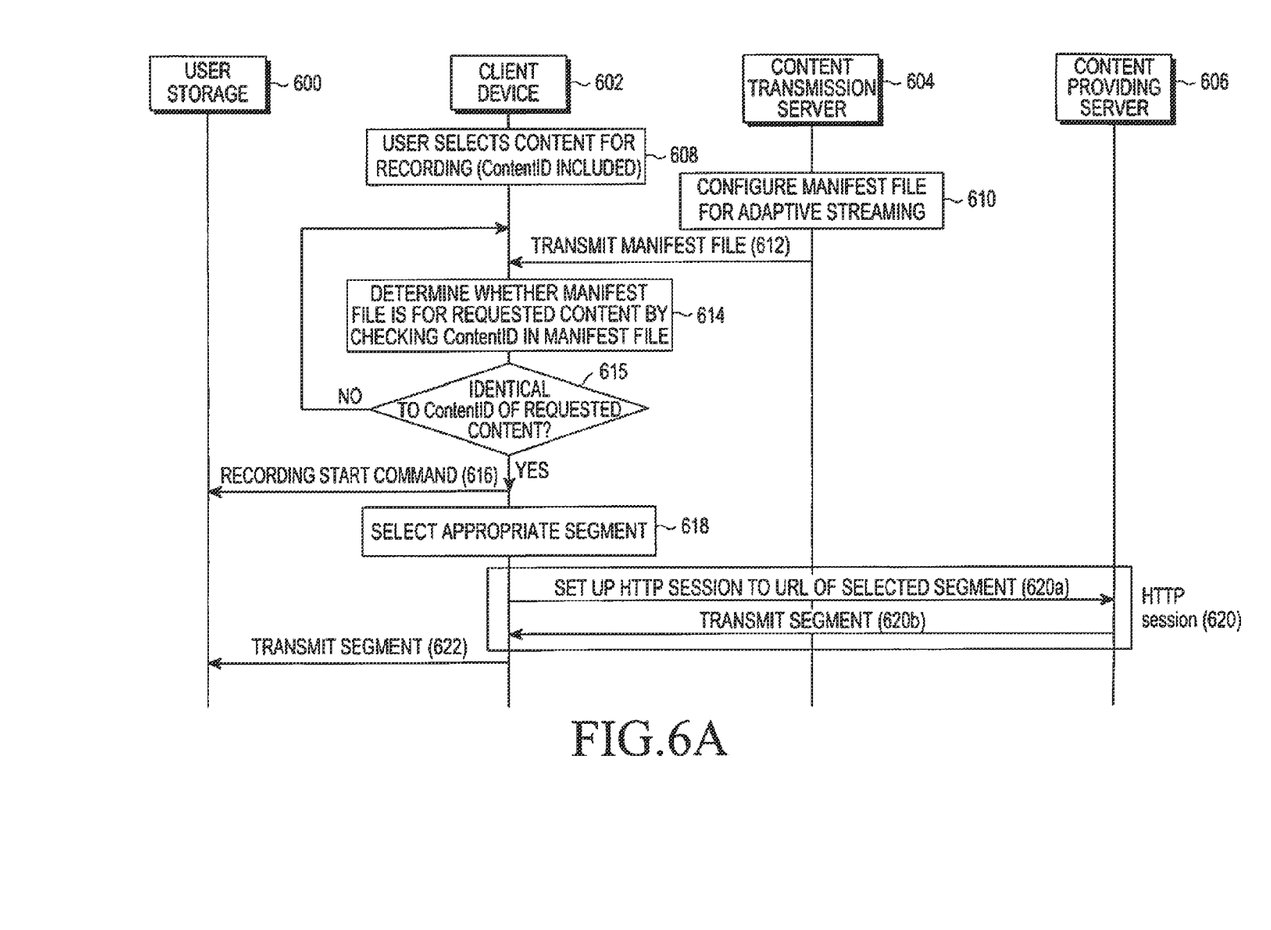
FIGS. 6A, 6B and 6C are diagrams illustrating signal flows for operations of devices according to another embodiment of the present invention.
Figure 6B:
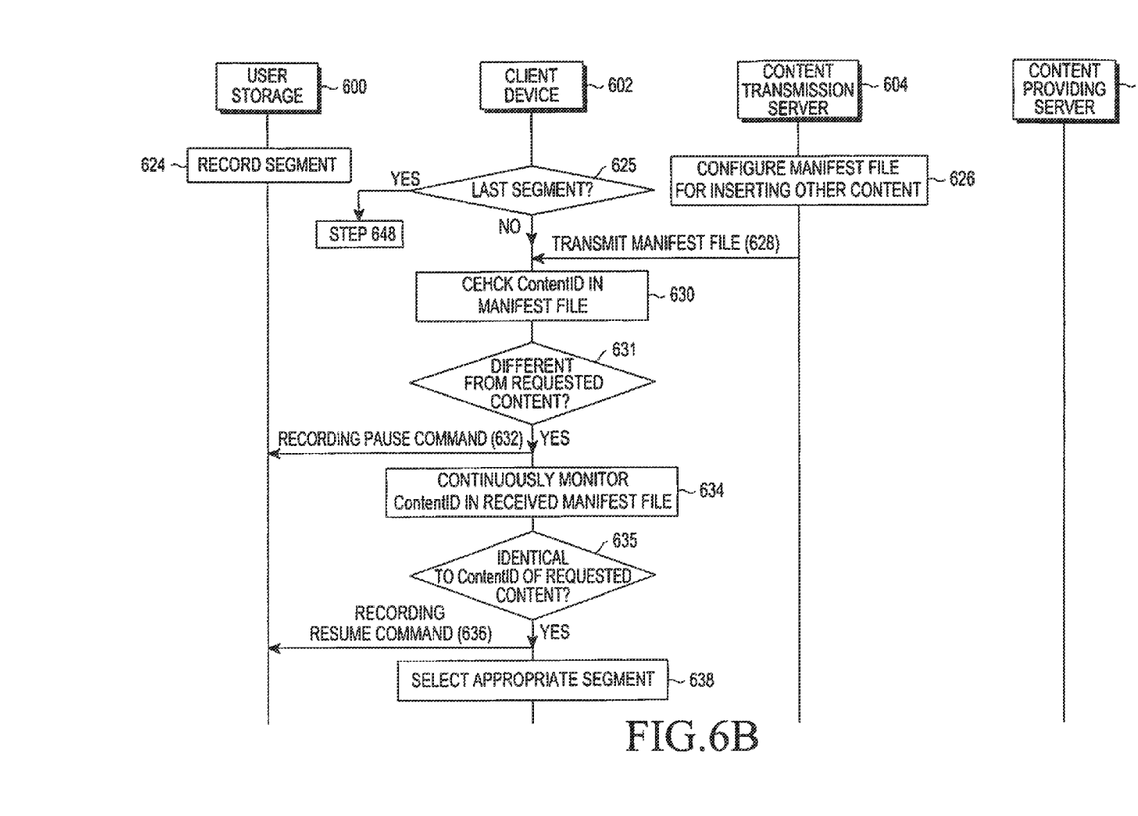
Figure 6C:
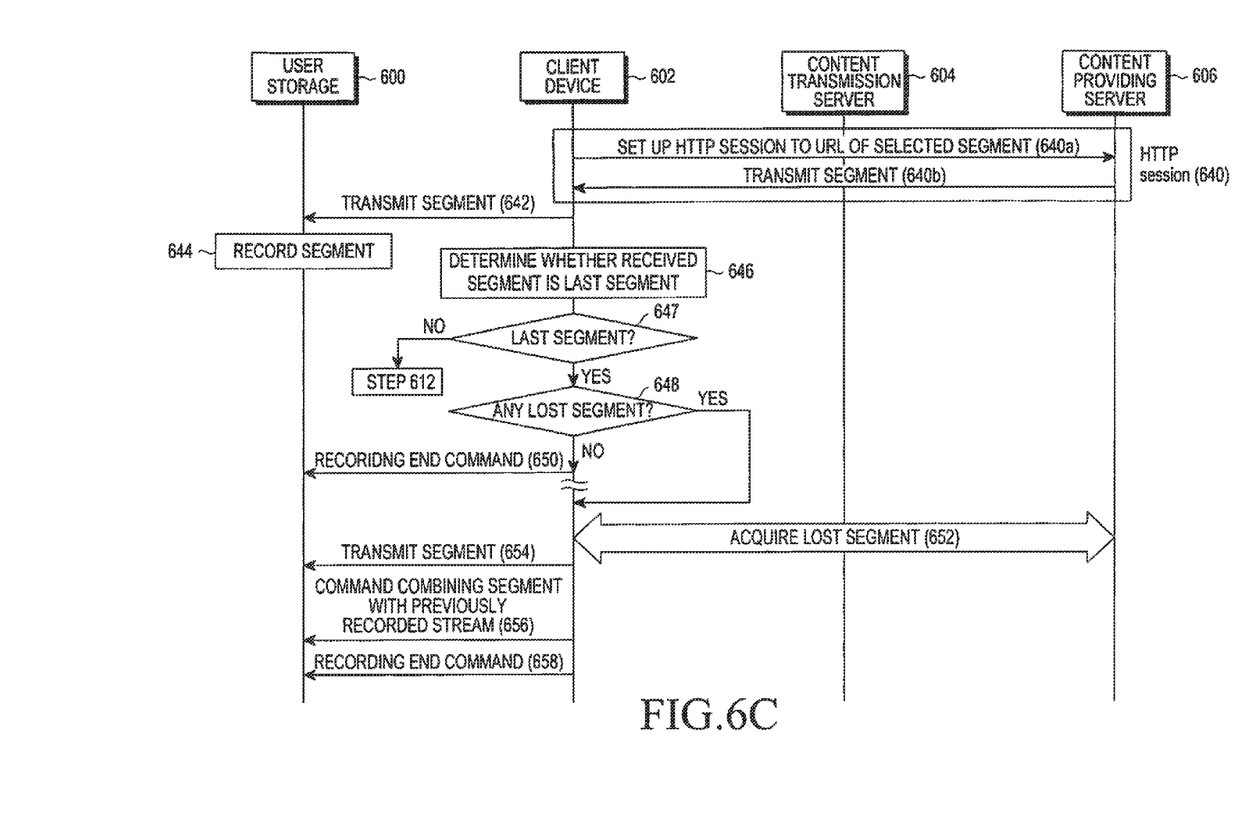

FIGS. 6A, 6B and 6C are diagrams illustrating signal flows for operations of devices according to another embodiment of the present invention.

In another embodiment of the present invention, when user non-preferred content, such as advertising, is inserted into preferred content during a live streaming broadcast, the non-preferred content is excluded from recording.

Referring to FIGS. 6A, 6B and 6C, a user selects content that they want to record through a client device 602 in step 608. Step 608 involves the selection of the content ID of the preferred content through the client device 602 by the user. The client device 602 then stores the content ID of the preferred content. A content transmission server 604 configures a manifest file to support adaptive streaming in step 610 and transmits the manifest file to the client device 602 in step 612.

Upon receipt of the manifest file, the client device 602 checks ContentID set in the received manifest file in step 614 and compares the ContentID with the content ID of the user-requested content for recording in step 615. If the ContentID is identical to the content ID of the user-requested content, the client device 602 transmits a recording start command to a user storage 600 in step 616. In step 618, the client device 602 selects an appropriate segment based on the manifest file received in step 612 according to the capabilities of the client device 602 or events related to the client device 602. However, if the ContentID is different than the content ID of the user-requested content, the client device 602 awaits reception of a new manifest file in step 612.

The client device 602 and a content providing server 606 set up an HTTP session in step 620. More specifically, the client device 602 sets up an HTTP session to access the URL on the content providing server 606 of the selected segment in step 620a. The content providing server 606 transmits the selected segment to the client device 602 using the HTTP session in step 620b. The client device 602 transmits the received segment to the user storage 600 in step 622 and the user storage 600 records the received segment in step 624.

The client device 602 determines whether the segment received in step 620b is the last segment in step 625. If the received segment is not the last segment, the client device 602 receives a manifest file in step 629. If the received segment is the last segment, the client device 602 jumps to step 648.

The content providing server 604 configures a manifest file for inserting other content (non-preferred content) in the middle of the preferred content in step 626 and transmits the manifest file to the client device 602. Upon receipt of the manifest file for other content (non-preferred content such as advertising) inserted into the preferred content, the client device 602 checks ContentID of the manifest file in step 630. If the ContentID of the manifest file is different than the content ID of the user-requested content, the client device 602 transmits a recording pause command to the user storage 600 in step 632.

Because the lastOfContent element of the content segment received in step 628 is not true (e.g., "1"), the user storage 600 should resume recording of the preferred content after the advertisement ends. Accordingly, the client device 602 continuously monitors ContentID of a received manifest file in step 634. If the ContentID of the received manifest file is identical to the content ID of the user-requested content in step 635, the client device 602 transmits a recording resume command to the user storage 600 in step 636.

In step 638, the client device 602 selects an appropriate file based on the manifest file received in step 634 according to the performance or situation of the network and the client device 602.

Then, the client device 602 and the content providing server 606 set up an HTTP session in step 640. More specifically, the client device 602 sets up an HTTP session to access the URL on the content providing server 606 of the segment selected in step 638, in step 640a. The content providing server 606 transmits the selected segment to the client device 602 using the HTTP session in step 640b. The client device 602 transmits the received segment to the user storage 600 in step 642 and the user storage 600 records the received segment in step 644.

The client device 602 checks the last segment indication information, the lastOfContent element of the manifest file and determines whether the segment is the last one of the user-requested content in step 646. If the received segment is be the last segment in the last segment indication information in step 647, the client device 602 determines whether any segments were lost a lost segment in step 648. If the segment is not the last segment, the client device 602 receives a new manifest file in step 612. In the absence of a lost segment in step 648, the client device 602 transmits a recording end command to the user storage 600 in step 650.

If it is confirmed that the received segment is the last segment of the content, the client device 602 ends the content ID detection procedure, determining that the recording has been completed.

In the case of a lost segment in step 648, the client device 602 acquires the lost segment from the content providing server 606 in step 652 and transmits the lost segment received from the content providing server 606 to the user storage 600 in step 654. In step 656, the client device 602 commands the user storage 600 to combine a previously recorded stream with the segment received in step 654. The client device 602 then transmits a recording end command to the user storage 600 in step 658.

In this embodiment, the content transmission server 604 inserts a lastOfContent element into a manifest file. However, without the lastOfContent element in the manifest file, the client device 602 can calculate the ID of the last segment using values such as Stream@firstSegmentNum and Stream@segmentCount. Stream@firstSegmentNum represents the number of the first segment of a stream and Stream@segmentCount represents the total number of the stream. For instance, the ID of the last segment may be determined to be Stream@firstSegmentNum+Stream@segmentCount−1. Accordingly, upon receipt of a segment with an ID identical to Stream@firstSegmentNum+Stream@segmentCount−1, the client device 602 may determine that the received segment is the last segment. This is possible assuming that one manifest file is used for one content item.

While the user storage 600 and the client device 602 are shown in FIGS. 6A, 6B and 6C as separately configured, the user storage 600 may be incorporated into the client device 602. The content transmission server 604 and the content providing server 606, which are separately configured in FIGS. 6A, 6B and 6C, may also be incorporated into a single server.

Figure 7:
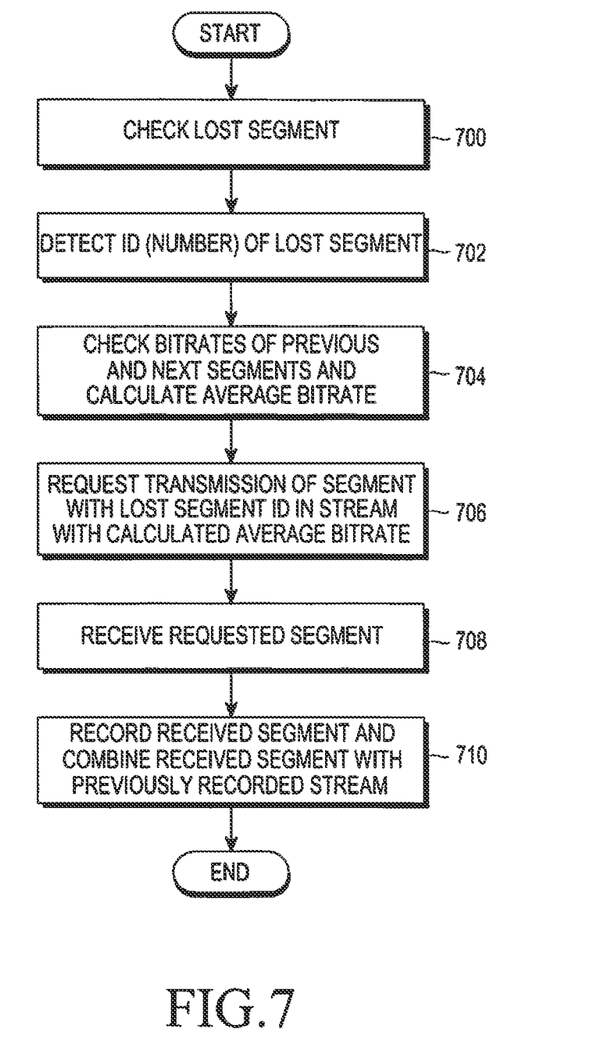
FIG. 7 is a flowchart illustrating an operation of a client device, in the case in which when adaptive streaming content is stored in a user storage, transmission of a content segment fails and thus lost according to an embodiment of the present invention.

FIG. 7 is a flowchart illustrating an operation of a client device, in the case where adaptive streaming content is stored in a user storage, transmission of a content segment has failed, according to an embodiment of the present invention.

Referring to FIG. 7, the client device determines that a specific segment has been lost, based on the IDs of received segments in step 700 and detects the ID of the lost segment in step 702. The client device checks the bitrates of the segments prior to and following the lost segment and averages the bitrates in step 704. The client device may instead use the bitrate of the previous segment as the average bitrate or may calculate the average of the bitrates of a plurality of previous segments as the average bitrate. The client device requests transmission of a segment having the ID of the lost segment in a stream with the average bitrate calculated in step 704 to a content providing server in step 706.

In step 708, the client device receives the requested segment from the content providing server. The client device commands a user storage to record the received segment in step 710. The user storage combines a previously recorded stream of content with the recorded content segment in step 710. Combining the previously recorded stream with the retransmitted segment will not be described herein in detail.

Figure 8:
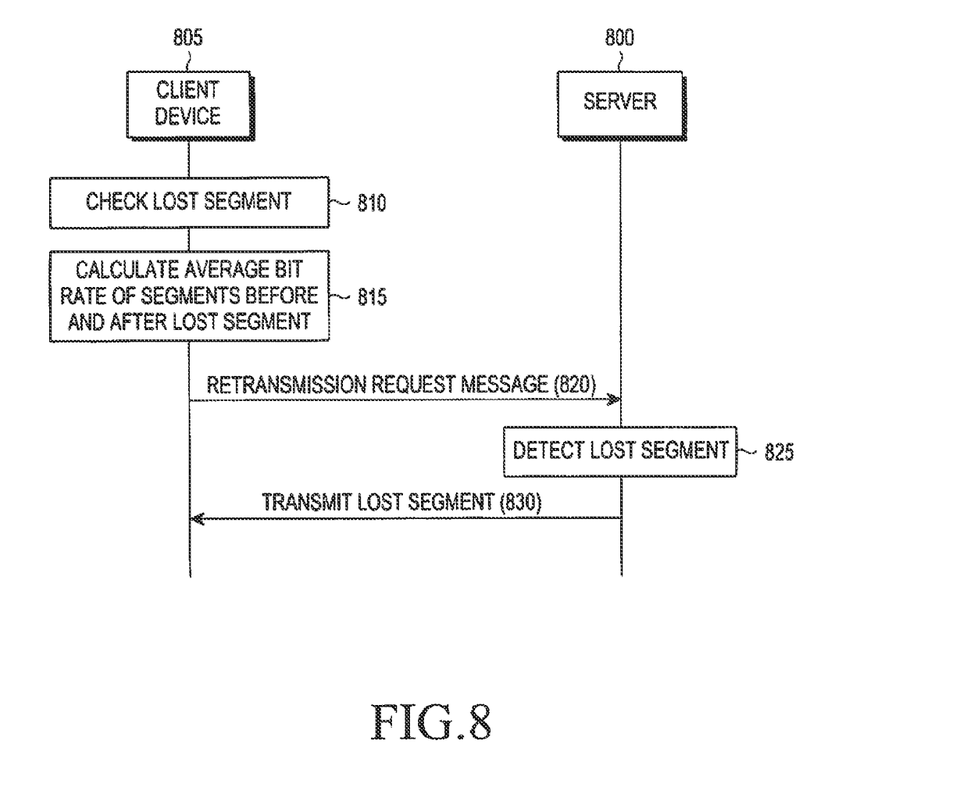
FIG. 8 is a diagram illustrating the signal flow for step 529 of FIG. 5B.

FIG. 8 is a diagram illustrating a signal flow for step 529 of FIG. 5B.

Referring to FIG. 8, a client device 805 identifies a lost segment in step 810 and calculates the average bitrate of the segments prior to and following the lost segment in step 815. The client device 805 may instead take the bitrate of the previous segment as the average bitrate or may calculate the average of the bitrates of a plurality of previous segments as the average bitrate. In step 820, the client device 805 transmits a retransmission request message including the ID of the lost segment and the average bitrate to a server 800 in step 820. The server 800 detects the lost segment in step 825. Specifically, the server 800 detects a stream corresponding to the average bitrate included in the retransmission request message and detects a segment having the same segment ID as the lost segment in the detected stream.

In step 830, the server 800 transmits the detected segment to the client device 805.

Figure 9:
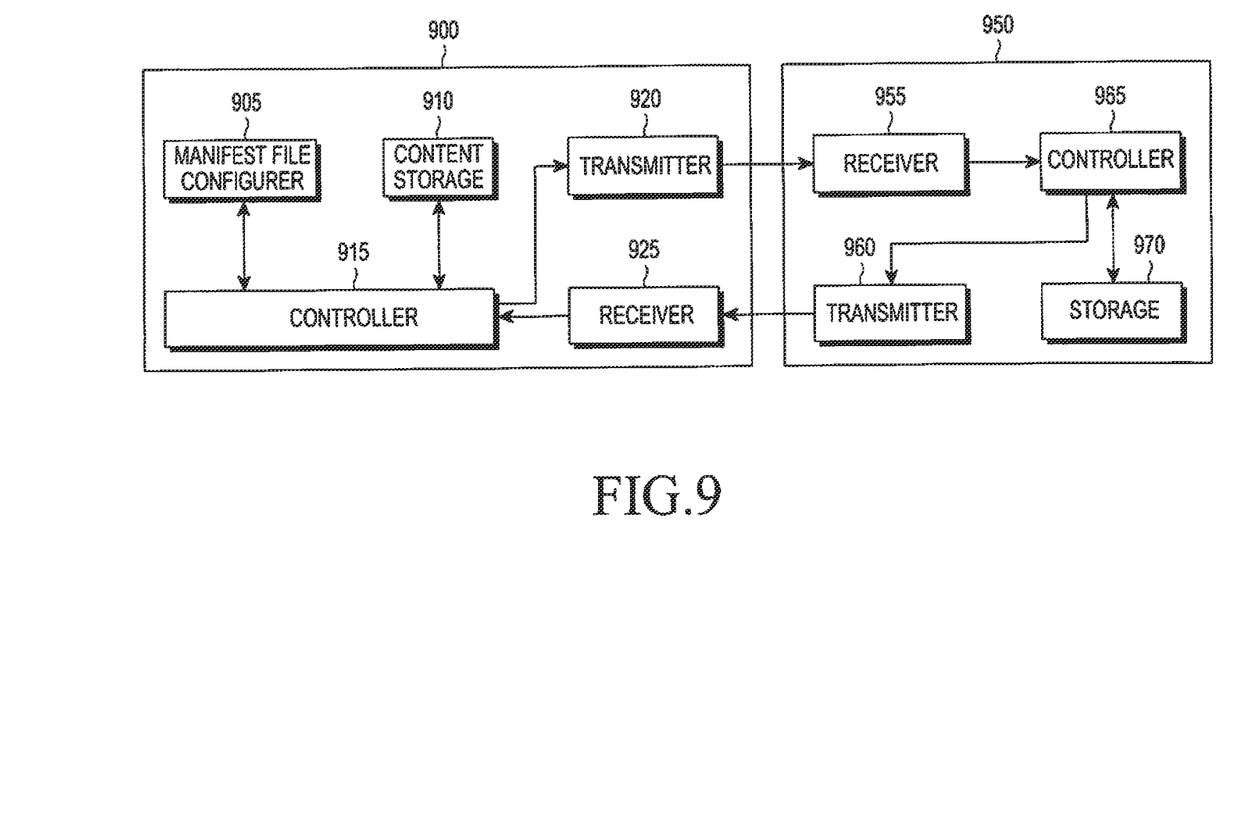
FIG. 9 is a block diagram of a client device and a server according to an embodiment of the present invention.

FIG. 9 is a block diagram of a client device 950 and a server 900 according to an embodiment of the present invention.

Referring to FIG. 9, in the server 900, a manifest file configurer 905 configures a manifest file according to an embodiment of the present invention. A content storage 910 stores content to be transmitted to the client device 950. The content storage 910 stores the segments of content at varying bitrates. A controller 915 transmits the manifest file configured by the manifest file configurer 905 to the client device 950 through a transmitter 920 and transmits content stored in the content storage 910 to the client device 950 through the transmitter 920.

The controller 915 receives a retransmission request message through a receiver 925, searches for content requested by the client device 950 in the content storage 910, and transmits the detected content to the client device 950 through the transmitter 920.

That is, upon receipt of a retransmission request message requesting retransmission of a lost segment among transmitted segments from the client device 950, the controller 915 searches for the lost segment in the content storage 910 and transmits the detected segment to the client device 950 through the transmitter 920. Specifically, the controller 915 searches for a stream corresponding to an average bitrate indicated by the retransmission request message in the content storage 910, and detects a segment having the same ID as the lost content in the detected stream. Thus, a segment whose retransmission has been requested by the client device 950 is detected.

In the client device 950, a controller 965 receives a segment of content and a manifest file of the content from the server 900 through a receiver 955 and requests transmission of a segment to the server 900 through a transmitter 960. A storage 970 stores segments received from the server 900 under the control of the controller 965. The storage 970 corresponds to the user storage 500 of FIG. 5.

The controller 965 analyzes the received manifest file and compares ContentID set in the manifest file with the content ID of the user-requested content for recording. If the ContentID is identical to the content ID of the user-requested content, the controller 965 transmits a recording start command to the storage 970, receives a segment corresponding to the ContentID from the server 900 using information included in the manifest file, and transmits the received segment to the storage 970. The controller 965 checks lastOfContent in the manifest file. If the received segment is the last segment, the controller 965 commands the storage 970 to end the recording by transmitting a recording end command. However, if the ContentID is different than the content ID of the user-requested content, the controller 965 controls the storage 970 to pause the recording.

The controller 965 determines whether there is a lost segment. If a segment is lostIf there is a lost segment, the controller 965 identifies the lost segment, acquires the lost segment from the server 900 through the receiver 955, and controls the storage 970 to combine the acquired segment with a previously recorded stream of the content.

Specifically, the controller 965 of the client device 950 determines the ID of the lost segment, checks the bitrates of the segments prior to and following the lost segment, and calculates the average of the bitratesbitrates. The controller 965 then transmits a retransmission request message including the calculated average bitrate and the ID of the lost segment to the server 900 through the transmitter 960.

As is apparent from the above description of the present invention, when real-time content is transmitted in an HTTP-based adaptive streaming transmission mechanism, a user can accurately record intended content in a user storage and a terminal can effectively receive a segment lost due to a transmission error. The present invention can provide an advanced service to a user that receives live content by realizing a simplified terminal, thereby creating profit.

While the present invention has been particularly shown and described with reference to embodiments thereof, it will be understood by those of ordinary skill in the art that various changes in form and details may be made therein without departing from the spirit and scope of the present invention as defined by the following claims and their equivalents.

What is claimed is:

1. A method for receiving broadcast content by a client device in a digital broadcast system, the method comprising:
   receiving segments of broadcast content;
   determining whether there is a lost segment among the received segments;
   identifying, if there is a lost segment, the lost segment;
   determining bitrates of segments prior to and following the lost segment;
   calculating an average of the bitrates;
   acquiring a segment corresponding to the lost segment in a stream based on the calculated average bitrate from a server; and
   combining the acquired segment with an already recorded stream of the broadcast content.

2. The method of claim 1, further comprising:
   transmitting a retransmission request message to the server, the retransmission request message including the calculated average bitrate and an IDentifier (ID) of the lost segment.

3. A client device for receiving broadcast content in a digital broadcast system, the device comprising:
- a receiver for receiving segments of broadcast content; and
- a controller for determining whether there is a lost segment among the received segments, identifying, if there is a lost segment, the lost segment, determining bitrates of segments prior to and following the lost segment, calculating an average of the bitrates, acquiring a segment corresponding to the lost segment in a stream based on the calculated average bitrate from a server, and controlling a storage to combine the acquired segment with an already recorded stream of the broadcast content.

4. The client device of claim 3, wherein the controller transmits a retransmission request message to the server, the retransmission request message including the calculated average bitrate and an IDentifier (ID) of the lost segment.

5. A method for providing broadcast content by a server in a digital broadcast system, the method comprising:
- transmitting segments of broadcast content to a client device;
- receiving a retransmission request message including an average bitrate and a segment IDentifier (ID) from the client device;
- detecting a stream corresponding to the average bitrate;
- detecting a lost segment having the same segment ID as the segment ID in the detected stream; and
- transmitting the detected lost segment to the client device.

6. The method of claim 5, wherein the average bitrate is calculated by an average bitrate of segments prior to and following the lost segment.

7. The method of claim 5, wherein the lost segment is combined with an already recorded stream of the broadcast content.

8. A server for providing broadcast content in a digital broadcast system, the method comprising:
- a receiver for receiving a retransmission request message including an average bitrate and a segment IDentifier (ID) from the client device;
- a controller for detecting a stream corresponding to the average bitrate, and detecting a lost segment having the same segment ID as the segment ID in the detected stream; and
- a transmitter for transmitting segments of broadcast content, and transmitting the detected lost segment to the client device.

9. The server of claim 8, wherein the average bitrate is calculated by an average bitrate of segments prior to and following the lost segment.

10. The server of claim 8, wherein the lost segment is combined with an already recorded stream of the broadcast content.

* * * * *